United States Patent
Wang et al.

(10) Patent No.: US 12,248,220 B2
(45) Date of Patent: Mar. 11, 2025

(54) DIMMING PANEL, METHOD FOR MANUFACTURING SAME, METHOD FOR DRIVING SAME, AND ARCHITECTURAL DIMMING GLASS

(71) Applicants: HEFEI BOE DISPLAY TECHNOLOGY CO., LTD., Anhui (CN); BOE Technology Group Co., Ltd., Beijing (CN)

(72) Inventors: Chaoyue Wang, Beijing (CN); Jianming Liu, Beijing (CN); Lu Niu, Beijing (CN)

(73) Assignees: HEFEI BOE DISPLAY TECHNOLOGY CO., LTD., Anhui (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/906,158

(22) PCT Filed: Oct. 11, 2021

(86) PCT No.: PCT/CN2021/123099
§ 371 (c)(1),
(2) Date: Sep. 12, 2022

(87) PCT Pub. No.: WO2022/105475
PCT Pub. Date: May 27, 2022

(65) Prior Publication Data
US 2023/0176427 A1     Jun. 8, 2023

(30) Foreign Application Priority Data
Nov. 23, 2020  (CN) .................... 202011321047.X

(51) Int. Cl.
*G02F 1/1343* (2006.01)
*G02F 1/133* (2006.01)
(Continued)

(52) U.S. Cl.
CPC .... *G02F 1/134309* (2013.01); *G02F 1/13306* (2013.01); *G02F 1/133512* (2013.01); *G02F 1/1339* (2013.01); *G02F 1/13737* (2013.01)

(58) Field of Classification Search
CPC .. G02F 1/0107; G02F 1/1339; G02F 1/13394; G02F 1/13396; G02F 1/161; G02F 1/1679
See application file for complete search history.

(56) References Cited

U.S. PATENT DOCUMENTS

| 10,466,392 B1 * | 11/2019 | Melcher | G02F 1/13439 |
| 2008/0258614 A1 * | 10/2008 | Ha | H10K 50/86 359/485.05 |

(Continued)

FOREIGN PATENT DOCUMENTS

| CN | 2690396 Y | * | 4/2005 |
| CN | 1784631 A | | 6/2006 |

(Continued)

OTHER PUBLICATIONS

International Search Report, mailed Dec. 9, 2021, from PCT/CN2021/123099.

(Continued)

*Primary Examiner* — Alexander P Gross
(74) *Attorney, Agent, or Firm* — Workman Nydegger

(57) ABSTRACT

A dimming panel, a method for manufacturing same, a method for driving same, and architectural dimming glass. The dimming panel includes: a first base substrate and a second base substrate; a first electrode layer on one side of the first base substrate facing the second base substrate and at least in the dimming region; a group of support columns on one side of the first electrode layer facing the second base substrate, and an orthographic projection of each of the support columns on the first base substrate is provided an overlapping region with an orthographic projection of the (Continued)

first electrode layer on the first base substrate; a transition layer between the first electrode layer and the support columns; a second electrode layer on one side of the second base substrate facing the first base substrate; and a dimming layer between the second electrode layer and the transition layer.

18 Claims, 9 Drawing Sheets

(51) Int. Cl.
*G02F 1/1335* (2006.01)
*G02F 1/1339* (2006.01)
*G02F 1/137* (2006.01)

(56) References Cited

U.S. PATENT DOCUMENTS

| | | | | |
|---|---|---|---|---|
| 2014/0016059 A1* | 1/2014 | Lee | ................ | G02B 5/3058 359/485.05 |
| 2014/0133005 A1 | 5/2014 | Sbar et al. | | |
| 2014/0236323 A1* | 8/2014 | Brown | ................ | G05B 15/02 700/90 |
| 2014/0327959 A1* | 11/2014 | Kawasaki | ................ | B32B 27/30 359/360 |
| 2014/0354924 A1 | 12/2014 | Byun et al. | | |
| 2015/0085341 A1* | 3/2015 | Ash | ................ | G02F 1/133602 359/275 |
| 2015/0092148 A1 | 4/2015 | Takano | | |
| 2015/0118465 A1 | 4/2015 | Wuillaume et al. | | |
| 2016/0170252 A1* | 6/2016 | Tang | ................ | G02F 1/13394 349/123 |
| 2016/0209685 A1 | 7/2016 | Tomikawa et al. | | |
| 2016/0216588 A1* | 7/2016 | Ah | ................ | G02F 1/155 |
| 2016/0252768 A1* | 9/2016 | Zhong | ................ | G02F 1/13737 349/43 |
| 2019/0067405 A1* | 2/2019 | Wang | ................ | H10K 50/824 |
| 2020/0223747 A1* | 7/2020 | Burrows | ................ | C09D 1/00 |
| 2020/0230920 A1 | 7/2020 | Keller et al. | | |
| 2021/0247636 A1 | 8/2021 | Xiao et al. | | |
| 2022/0003038 A1 | 1/2022 | Chen et al. | | |
| 2022/0373835 A1 | 11/2022 | Chen et al. | | |

FOREIGN PATENT DOCUMENTS

| | | |
|---|---|---|
| CN | 203894512 U | 10/2014 |
| CN | 104216185 A | 12/2014 |
| CN | 105334658 A | 2/2016 |
| CN | 106200133 A | 12/2016 |
| CN | 106232352 A | 12/2016 |
| CN | 107579165 A | 1/2018 |
| CN | 110520292 A | 11/2019 |
| CN | 209640654 U | 11/2019 |
| CN | 210803935 A | 6/2020 |
| CN | 111562696 A | 8/2020 |
| CN | 111624800 A | 9/2020 |
| CN | 111638618 A | 9/2020 |
| CN | 214311227 U | 9/2021 |
| EP | 3190459 A1 | 7/2017 |
| JP | S5984221 A | 5/1984 |
| JP | 2009162861 A * | 7/2009 |
| WO | 2016008375 A1 | 1/2016 |

OTHER PUBLICATIONS

Chinese First Office Action, mailed May 7, 2024, from Chinese Application No. 202011321047.X, 26 pages.

* cited by examiner

DIMMING PANEL, METHOD FOR MANUFACTURING SAME, METHOD FOR DRIVING SAME, AND ARCHITECTURAL DIMMING GLASS

CROSS REFERENCE TO RELATED APPLICATION

The present application is a National Stage of International Application No. PCT/CN2021/123099, filed on Oct. 11, 2021, which claims priority to Chinese Patent Application No. 202011321047.X, filed to China National Intellectual Property Administration on Nov. 23, 2020, which is incorporated in its entirety herein by reference.

FIELD

The present disclosure relates to the field of dimming technology, and particularly relates to a dimming panel, a method for manufacturing same, a method for driving same, and architectural dimming glass.

BACKGROUND

At present, dimming panels have been used in the fields of architecture and transportation in an increasingly broad range. Polymer dispersed liquid crystal dimming panels, electrochromic dimming panels, dye liquid crystal dimming panels and other products are available in the existing intelligent dimming panel market.

SUMMARY

In an aspect, an embodiment of the present disclosure provides a dimming panel. The dimming panel has a dimming region and includes: a first base substrate and a second base substrate opposite to each other; a first electrode layer on one side of the first base substrate facing the second base substrate and at least in the dimming region; a plurality of support columns on one side of the first electrode layer facing the second base substrate, wherein an orthographic projection of each of the support columns on the first base substrate is provided an overlapping region with an orthographic projection of the first electrode layer on the first base substrate; a transition layer between the first electrode layer and the support columns; a second electrode layer on one side of the second base substrate facing the first base substrate, wherein an orthographic projection of the second electrode layer on the first base substrate at least covers an orthographic projection of the first electrode layer in the dimming region; and a dimming layer between the second electrode layer and the transition layer.

Optionally, the dimming panel provided in an embodiment of the present disclosure further includes a peripheral region on one side of the dimming region, a conductive portion in the peripheral region, and a third electrode layer on the first base substrate and in the peripheral region. The third electrode layer is insulated from the first electrode layer. The third electrode layer is electrically connected to the second electrode layer through the conductive portion.

Optionally, in the dimming panel provided in an embodiment of the present disclosure, the third electrode layer and the first electrode layer are in a same layer, the first electrode layer is in the dimming region, and an orthographic projection of the transition layer on the first base substrate completely covers the orthographic projection of the first electrode layer on the first base substrate.

Optionally, in the dimming panel provided in an embodiment of the present disclosure, a first electrode layer is in the dimming region and the peripheral region, the third electrode layer is on one side of the transition layer away from the first electrode layer, and an orthographic projection of the transition layer on the first base substrate is in the orthographic projection of the first electrode layer on the first base substrate.

Optionally, the dimming panel provided in an embodiment of the present disclosure further includes a sealant in the peripheral region. The conductive portion is multiplexed as the sealant.

Optionally, the dimming panel provided in an embodiment of the present disclosure further includes: a first wire electrically connected to the first electrode layer, a second wire electrically connected to the third electrode layer, and a digital-controlled direct current power. The digital-controlled direct current power is connected between the first wire and the second wire.

Optionally, in the dimming panel provided in an embodiment of the present disclosure, in a direction perpendicular to the first base substrate, the transition layer is provided with a thickness ranging from 2500 Å to 15000 Å.

Optionally, in the dimming panel provided in an embodiment of the present disclosure, the first electrode layer is a planar electrode, and the second electrode layer is a planar electrode or includes a plurality of block sub-electrodes.

Optionally, in the dimming panel provided in an embodiment of the present disclosure, in a condition that the second electrode layer includes the plurality of block sub-electrodes, the dimming panel further includes: a plurality of transistors between the second base substrate and the second electrode layer, a black matrix between the first base substrate and the first electrode layer, and a plurality of color resists between the black matrix and the first electrode layer. Each of the transistors is electrically connected to one corresponding block sub-electrode. The black matrix is provided with a plurality of openings. Each of the openings is internally provided with one corresponding color resist.

Optionally, in the dimming panel provided in an embodiment of the present disclosure, the dimming layer is a dye liquid crystal layer, and the dimming panel further includes: a first orientation layer on one side of the support columns facing the dimming layer, and a second orientation layer on one side of the second electrode layer facing the dimming layer.

Optionally, the dimming panel provided in an embodiment of the present disclosure further includes: an electrochromic layer on one side of the transition layer facing the dimming layer and in the dimming region, and an ion storage layer on one side of the second electrode layer facing the dimming layer and in the dimming region. The dimming layer is an electrolyte solution.

In another aspect, an embodiment of the present disclosure provides architectural dimming glass, which includes the dimming panel provided in the embodiment of the present disclosure.

Optionally, the architectural dimming glass provided in an embodiment of the present disclosure further includes: an anti-reflection structure. The anti-reflection structure is on one side of a first base substrate away from a second base substrate, and/or on one side of the second base substrate away from the first base substrate.

Optionally, in the architectural dimming glass provided in an embodiment of the present disclosure, the anti-reflection structure includes a third base substrate, and a plurality of wire grid structures that are on one side of the third base substrate facing the first base substrate and/or the second base substrate. Each of the wire grid structures includes a first metal wire grid, a second inorganic wire grid and a third metal wire grid that are stacked. The first metal wire grid is provided with a smaller reflectivity than that of the third metal wire grid.

Optionally, the architectural dimming glass provided in an embodiment of the present disclosure further includes: a low-emissivity film on one side of a second base substrate away from a first base substrate. The low-emissivity film is provided with a surface emissivity lower than 0.25 and a reflectivity greater than 80% to an infrared ray.

Optionally, the architectural dimming glass provided in an embodiment of the present disclosure further includes: an energy-saving film on one side of a first base substrate away from a second base substrate. The energy-saving film includes a metal film and a polyester base that are sequentially on one side of the first base substrate away from the second base substrate.

Optionally, the architectural dimming glass provided in an embodiment of the present disclosure further includes: a functional layer between a first base substrate and a first electrode layer. The functional layer includes at least one of a black oxide layer, an anti-radiation layer or an energy-saving layer. The black oxide layer includes: at least one of a molybdenum-niobium alloy film, a molybdenum oxide film or a composite film of silicon nitride and amorphous silicon. The anti-radiation layer includes at least one of an aluminum metal film, an aluminum alloy film or an aluminum metal compound film. The energy-saving layer includes at least one of a silver metal film, a silver alloy film or a silver metal compound film.

Optionally, in the architectural dimming glass provided in an embodiment of the present disclosure, the functional layer includes a black oxide layer, an anti-radiation layer and an energy-saving layer that are sequentially on one side of the first base substrate facing a first electrode layer.

Optionally, in the architectural dimming glass provided in an embodiment of the present disclosure, the black oxide layer includes: at least one of a molybdenum-niobium alloy film, a molybdenum oxide film or a composite film of silicon nitride and amorphous silicon, the anti-radiation layer includes at least one of an aluminum metal film, an aluminum alloy film or an aluminum metal compound film, and the energy-saving layer includes at least one of a silver metal film, a silver alloy film or a silver metal compound film.

In another aspect, an embodiment of the present disclosure provides a method for manufacturing any one of the dimming panels described above. The method includes: providing a first base substrate and a second base substrate; sequentially forming a first electrode layer, a transition layer and a plurality of support columns on the first base substrate, wherein the first electrode layer is at least formed in a dimming region of the dimming panel, and an orthographic projection of each of the support columns on the first base substrate is provided an overlapping region with an orthographic projection of the first electrode layer on the first base substrate; forming a second electrode layer on the second base substrate and at least in the dimming region; forming a dimming layer on one side, with the second electrode layer, of the second base substrate; and aligning the first base substrate with the second base substrate to locate the dimming layer between the second electrode layer and the transition layer.

In another aspect, an embodiment of the present disclosure provides a method for driving any one of the dimming panels described above. The method includes: providing a first voltage for a first electrode layer and a second voltage for a second electrode layer; and controlling the dimming panel to achieve a target transparency by driving the dimming layer through a difference between the first voltage and the second voltage, wherein the difference between the first voltage and the second voltage is positively correlated with a transparency of the dimming panel.

Optionally, in the method provided in an embodiment of the present disclosure, the providing the first voltage for the first electrode layer and the second voltage for the second electrode layer includes: providing the first voltage for the first electrode layer and the second voltage for the second electrode layer by using a digital-controlled direct current power.

Optionally, in the method provided in an embodiment of the present disclosure, the providing a first voltage for a first electrode layer and a second voltage for a second electrode layer specifically includes: converting light passing through the dimming panel into an electrical signal by using a photosensitive sensor, and outputting the electrical signal to a digital-controlled direct current power; and providing, by the digital-controlled direct current power, the first voltage for the first electrode layer and the second voltage for the second electrode layer according to the electrical signal.

DETAILED DESCRIPTION OF THE EMBODIMENTS

Figure 1:
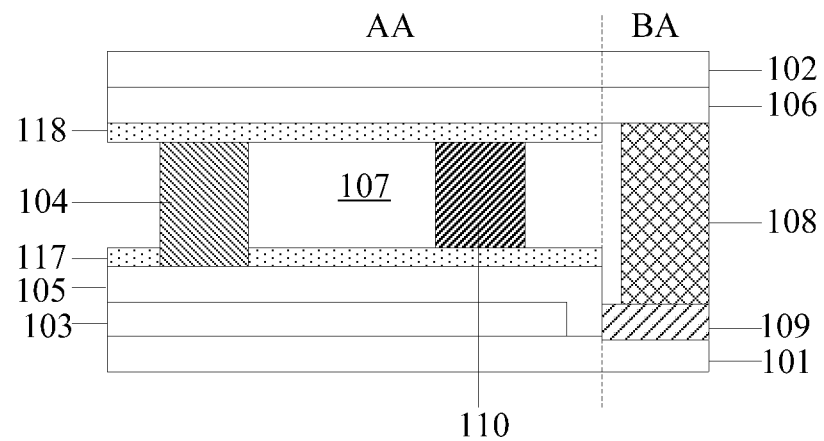
FIG. 1 is a structural schematic diagram of a dimming panel provided in an embodiment of the present disclosure.

For making the objectives, technical solutions and advantages of embodiments of the present disclosure more obvious, the technical solutions of the embodiments of the present disclosure will be clearly and completely described below in conjunction with the accompanying drawings in the embodiments of the present disclosure. It should be noted that a size and a shape of each figure in the drawings do not reflect a true scale, but only for illustrating the present disclosure. Throughout the drawings, identical or similar reference numerals denote identical or similar elements or elements having identical or similar functions. Apparently, the embodiments described are some rather than all of the embodiments of the present disclosure. Based on the embodiments of the present disclosure, all other embodiments obtained by those of ordinary skill in the art without making creative efforts fall within the scope of protection of the present disclosure.

Unless otherwise defined, technical or scientific terms used herein should have ordinary meanings as understood by those of ordinary skill in the art to which the present disclosure belongs. "First", "second" and similar words used in the description and claims of the present disclosure do not indicate any order, amount or importance, but only for distinguishing different components. "Including", "comprising" or other similar words indicate that the elements or objects before the word include elements or objects after the word and their equivalents, without excluding other elements or objects. "Inside", "outside", "upper", "lower", etc. are only used to indicate a relative positional relation. After an absolute position of the described object changes, the relative positional relation may also change accordingly.

In related technologies, a dimming panel mainly includes a first substrate and a second substrate opposite to each other, a first electrode layer on one side of the first substrate facing the second substrate, a second electrode layer on one side of the second substrate facing the first substrate, support columns that are between the first substrate and the second substrate and make contact with the first electrode layer, a dimming layer filling spaces among all the support columns, and orientation layers at two sides of the dimming layer. However, in an actual production process, an adhesive force between the first electrode layer and the support columns is poor, resulting in a great risk of fall-off of the support columns, especially after the orientation layers is oriented (e.g., through rubbing) or in a vibration environment.

To solve the problems existing in the related technologies, an embodiment of the present disclosure provides a dimming panel. As shown in FIG. 1, the dimming panel is provided with a dimming region AA and may include: a first base substrate 101 and a second base substrate 102 opposite to each other; a first electrode layer 103 on one side of the first base substrate 101 facing the second base substrate 102 and at least in the dimming region AA; a plurality of support columns 104 on one side of the first electrode layer 103 facing the second base substrate 102, wherein an orthographic projection of each of the support columns 104 on the first base substrate 101 is provided an overlapping region with an orthographic projection of the first electrode layer 103 on the first base substrate 101; a transition layer 105 between the first electrode layer 103 and the support columns 104; a second electrode layer 106 on one side of the second base substrate 102 facing the first base substrate 101, wherein an orthographic projection of the second electrode layer 106 on the first base substrate 101 at least covers an orthographic projection of the first electrode layer 103 in the dimming region AA; and a dimming layer 107 between the second electrode layer 106 and the transition layer 105.

In the dimming panel provided in an embodiment of the present disclosure, the transition layer 105 is between the first electrode layer 103 and the support columns 104, such that the support columns 104 are attached to the first electrode layer 103 via the transition layer 105, thereby enhancing adhesion between the support columns 104 and the first electrode layer 103, and reducing risks of fall-off of the support columns 104. In some embodiments, the transition layer 105 may be made of transparent inorganic insulating materials, such as silicon oxide, silicon nitride and silicon oxynitride. The first electrode layer 103 and the second electrode layer 106 may be made of transparent conductive materials such as indium tin oxide.

Moreover, in the related technologies, the first substrate is cut to expose an electrode bonding region (pad) of the second substrate, and the second substrate is cut to expose an electrode bonding region of the first substrate; and then circuit crimping (bonding) is conducted on the electrode bonding region of the second substrate and the electrode bonding region of the first substrate separately, so as to provide corresponding driving signals via circuits. The double-sided special-shaped cutting process and double-sided circuit crimping process described above are difficult, require special corresponding apparatuses, and have a risk of breakage. Specifically, an edge breakage rate caused by two-time cuttings is greater than 30%, and a breakage rate caused by turn-over crimping greatly increases with increase in size.

Figure 2:
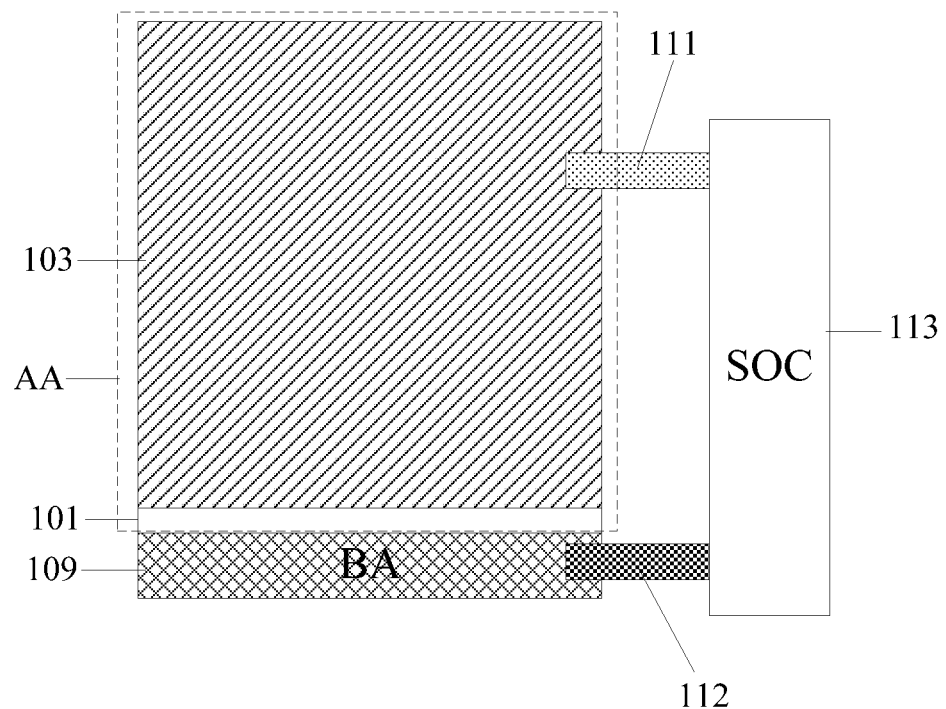
FIG. 2 is another structural schematic diagram of a dimming panel provided in an embodiment of the present disclosure.

In view of this, in the dimming panel provided in an embodiment of the present disclosure, as shown in FIGS. 1 and 2, the dimming panel may further include a peripheral region BA on one side of the dimming region AA, a conductive portion 108 in the peripheral region BA, and a third electrode layer 109 on the first base substrate 101 and in the peripheral region BA. The third electrode layer 109 is insulated from the first electrode layer 103. The third electrode layer 109 is electrically connected to the second electrode layer 106 through the conductive portion 108.

The first base substrate 101 is additionally provided with the third electrode layer 109, and the third electrode layer 109 is electronically connected with the second electrode layer 106 of the second base substrate 102 by using the conductive portion 108, such that circuit crimping may be conducted on the first electrode layer 103 and the second electrode layer 106 at the same time by cutting only the second base substrate 102 to expose the first electrode layer 103 and the third electrode layer 109 on the first base substrate 101. Compared with the technical solution of two-time cuttings and double-sided circuit crimping in the related technologies, the present disclosure only requires one-time cutting and single-sided crimping, thereby greatly reducing process difficulty and a breakage rate.

Optionally, in the dimming panel provided in an embodiment of the present disclosure, as shown in FIG. 1, the third electrode layer 109 and the first electrode layer 103 may be in the same layer, the first electrode layer 103 may be in the dimming region AA, and an orthographic projection of the transition layer 105 on the first base substrate 101 completely covers the orthographic projection of the first electrode layer 103 on the first base substrate 101. In this way, the transition layer 105 fills a gap between the first electrode layer 103 and the third electrode layer 109, thereby achieving mutual insulation therebetween. Meanwhile, the transition layer 105 does not exist on the third electrode layer 109, such that the third electrode layer 109 may be ensured to be electrically connected to the second electrode layer 106 through the conductive portion 108. The above description takes patterns of the first electrode layer 103 and the third electrode layer 109 manufactured by a one-time patterning process as an example. In some other embodiments, the third electrode layer 109 and the first electrode layer 103 may be in different layers, that is, the patterns of the first electrode layer 103 and the third electrode layer 109 are separately manufactured by a two-time patterning process. Optionally, the third electrode layer 109 may be made of indium tin oxide, copper, molybdenum, aluminum, etc.

Figure 3:
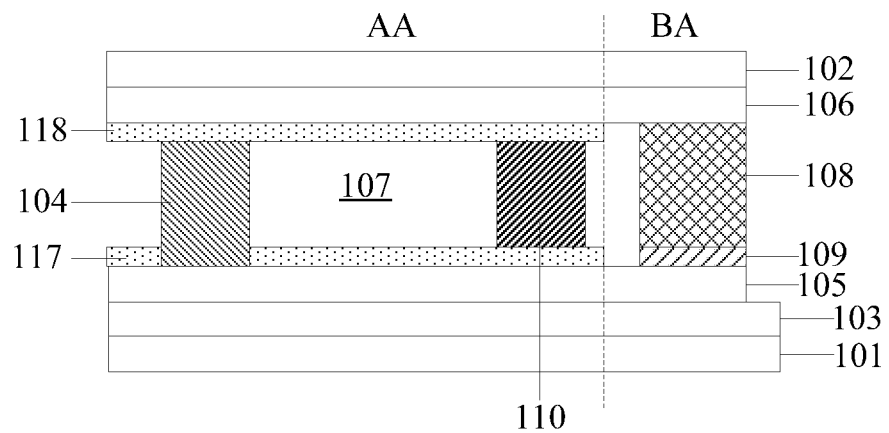
FIG. 3 is another structural schematic diagram of a dimming panel provided in an embodiment of the present disclosure.

Optionally, in the dimming panel provided in an embodiment of the present disclosure, as shown in FIG. 3, a first electrode layer 103 may be in the dimming region AA and the peripheral region BA, the third electrode layer 109 may be on one side of the transition layer 105 away from the first electrode layer 103, and the orthographic projection of the transition layer 105 on the first base substrate 101 may be in the orthographic projection of the first electrode layer 103 on the first base substrate 101. In this way, the transition layer 105 is between the first electrode layer 103 and the third electrode layer 109, thereby achieving mutual insulation therebetween. Meanwhile, the third electrode layer 109 is on the transition layer 105, such that the third electrode layer 109 may be ensured to be electrically connected to the second electrode layer 106 via the conductive portion 108.

Figure 4:
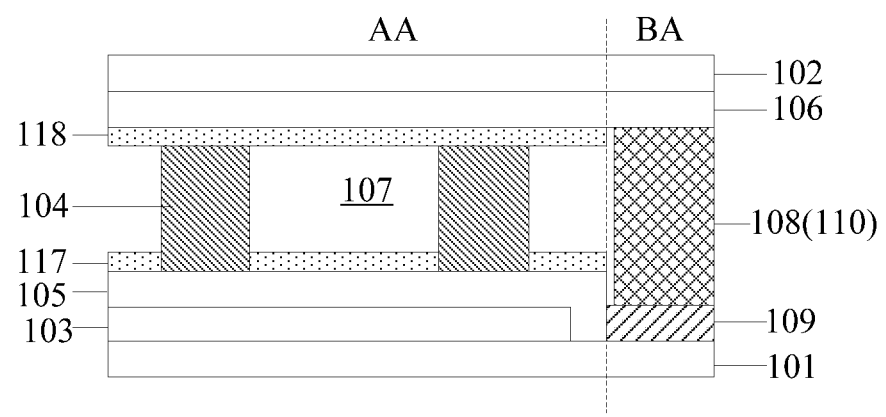
FIG. 4 is another structural schematic diagram of a dimming panel provided in an embodiment of the present disclosure.
Figure 5:
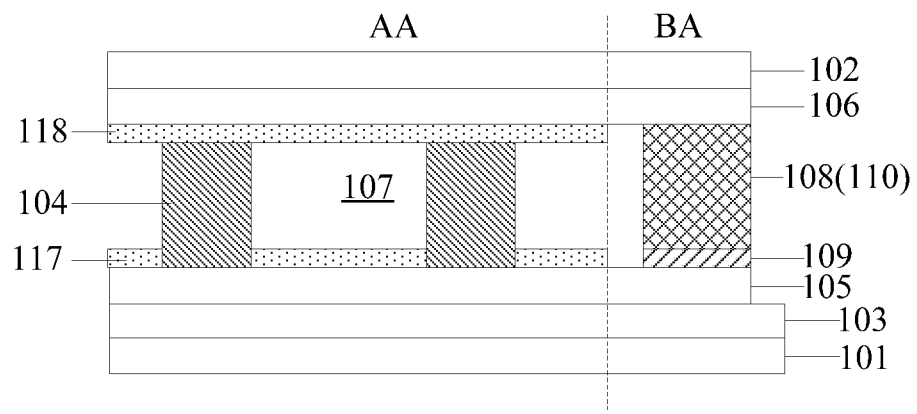
FIG. 5 is another structural schematic diagram of a dimming panel provided in an embodiment of the present disclosure.

Optionally, in the dimming panel provided in an embodiment of the present disclosure, as shown in FIGS. 1 and 3, the conductive portion 108 may be made of conductive paste; or as shown in FIGS. 4 and 5, the dimming panel may further include a sealant 110 in the peripheral region BA, and the conductive portion 108 may be multiplexed as the sealant 110. Optionally, the sealant 110 is doped with conductive particles such as gold or silver.

Optionally, as shown in FIG. 2, the dimming panel provided in an embodiment of the present disclosure may further include: a first wire 111 electrically connected to the first electrode layer 103, a second wire 112 electrically connected to the third electrode layer 109, and a digital-controlled direct current power (system on chip, SOC) 113. The digital-controlled direct current power 113 is connected between the first wire 111 and the second wire 112. The digital-controlled direct current power 113 is capable of adjusting a voltage difference between the first electrode layer 103 and the third electrode layer 109 (and the second electrode layer 106), such that the dimming layer 107 controls a transparency of the dimming panel according to the voltage difference.

Optionally, in the dimming panel provided in an embodiment of the present disclosure, in order to effectively increase an adhesive force, in a direction perpendicular to the first base substrate 101, the transition layer 105 is provided with a thickness ranging from 2500 Å to 15000 Å. For example, the thickness may be 2500 Å, 3000 Å, 4000 Å, 5000 Å, 6000 Å, 7000 Å, 8000 Å, 9000 Å, 10000 Å, 11000 Å, 12000 Å, 13000 Å, 14000 Å, or 15000 Å, etc.

Optionally, in the dimming panel provided in an embodiment of the present disclosure, the first electrode layer 103 may be a planar electrode, and the second electrode layer 106 may be a planar electrode or may include a plurality of block sub-electrodes, thereby achieving an overall dimming function or a divisional dimming function.

Figure 6:
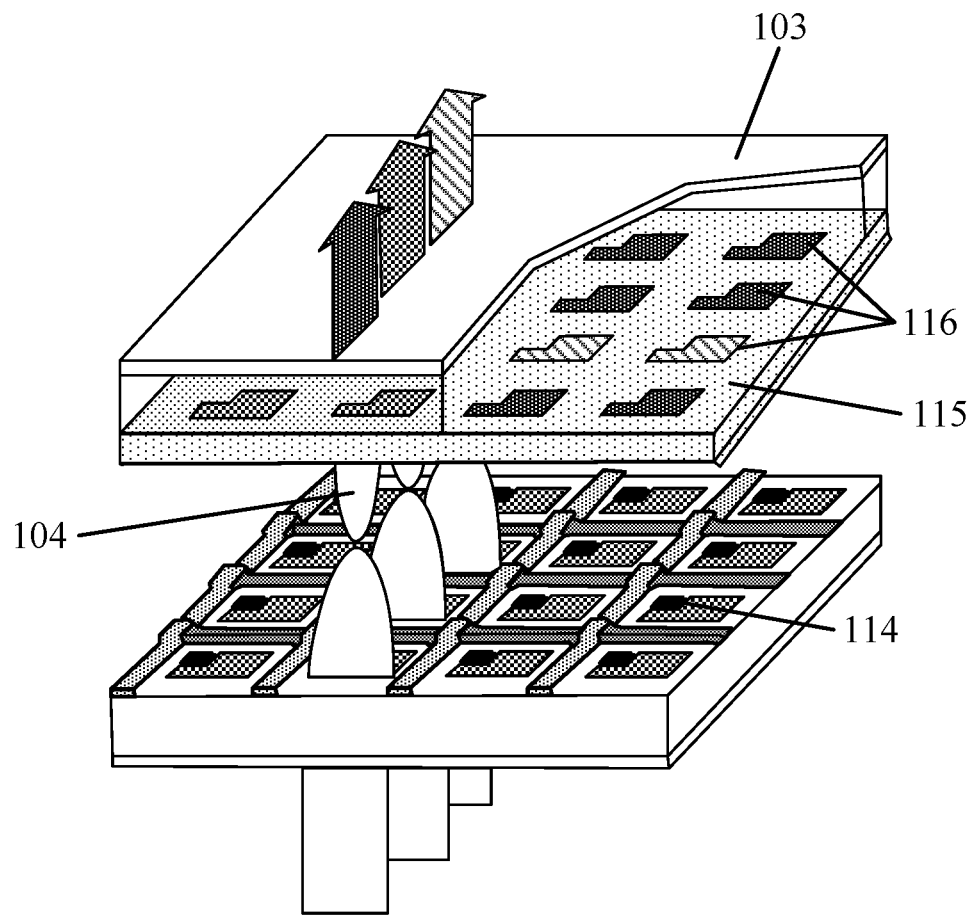
FIG. 6 is another structural schematic diagram of a dimming panel provided in an embodiment of the present disclosure.

Optionally, in the dimming panel provided in an embodiment of the present disclosure, as shown in FIG. 6, when the second electrode layer 106 includes the plurality of block sub-electrodes, the dimming panel may further include: a plurality of transistors 114 between the second base substrate 102 and the second electrode layer 106, a black matrix 115 between the first base substrate 101 and the first electrode layer 103, and a plurality of color resists 116 between the black matrix 115 and the first electrode layer 103. Each transistor 114 is electrically connected to one corresponding block sub-electrode. The black matrix 115 is provided with a plurality of openings. Each opening is internally provided with one corresponding color resist 116. In this case, the first base substrate 101 and various film layers thereon are equivalent to a color film (CF) substrate, and the second base substrate 102 and various film layers thereon are equivalent to an array substrate, thereby achieving color screen display. In some embodiments, a combination of a high-transmittance color resist and an ultra-thin color resist may be used to achieve color transparent display. In some other embodiments, no color resist may be provided to achieve transparent display and black non-transparent display.

Optionally, in the dimming panel provided in an embodiment of the present disclosure, as shown in FIGS. 1, and 3 to 5, the dimming layer 107 may be a dye liquid crystal layer, and the dimming panel may further include: a first orientation layer 117 on one side of the transition layer 105 facing the dimming layer 107, and a second orientation layer 118 on one side of the second electrode layer 106 facing the dimming layer 107. The first orientation layer 117 and the second orientation layer 118 may be provided to make a liquid crystal molecule in the dimming layer 107 have a pretilt angle, thereby increasing a response speed. During specific implementation, the dye liquid crystal layer may be made of black dye liquid crystal, dye liquid crystal having a chiral agent or color dye liquid crystal.

Figure 7:
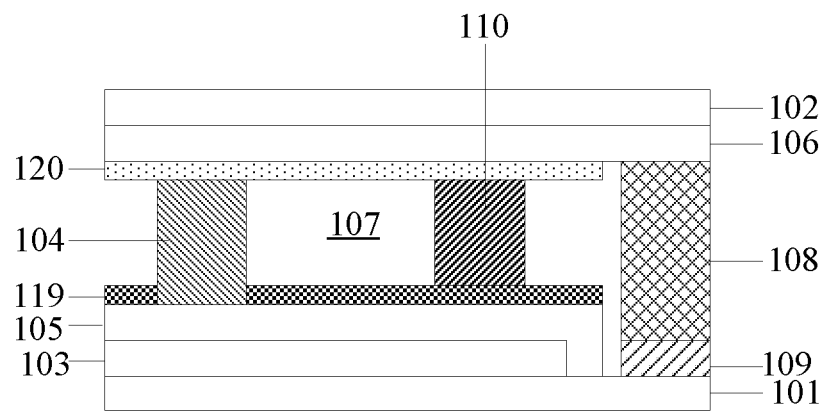
FIG. 7 is another structural schematic diagram of a dimming panel provided in an embodiment of the present disclosure.

Optionally, as shown in FIG. 7, the dimming panel provided in an embodiment of the present disclosure may further include: an electrochromic layer 119 on one side of the transition layer 105 facing the dimming layer 107 and in the dimming region AA, and an ion storage layer 120 on one side of the second electrode layer 106 facing the dimming layer 107 and in the dimming region AA. The dimming layer 107 is an electrolyte solution, which has the advantages of large-size manufacturing, no electrolyte leakage, simple encapsulation, short response time, a low driving voltage, uniform coloring and fading, etc. Specifically, the electrochromic layer 119 and the ion storage layer 120 have no continuous deposition and no interface difference, thereby reducing requirements for deposition devices. The electrolyte solution is uniformly dispersed in a box, with a high ion transition speed, such that response time is remarkably shortened, and coloring and fading are uniform. During large-size manufacturing, the electrolyte solution has a much lower driving voltage than that of an inorganic all-solid electrolyte. A large-size dimming panel having a maximum area of 3.2 m*3.2 m may be manufactured, which is much greater than 1.8 m*3.2 m currently known, thereby greatly reducing splicing cost in use of the large-area curtain wall. In addition, the functional electrochromic dimming panel with different regions for divisional display may be manufactured by controlling divisional electrodes.

Optionally, in the dimming panel provided in an embodiment of the present disclosure, a diameter of a first surface of each of the support columns 104 making contact with the transition layer 105 and a diameter of a second surface of each of the support columns away from the transition layer are micron-sized (for example, the first surface has a size of 25 μm, and the second surface has a size of 35 μm). The support columns 104 have a distribution density of 3/mm$^2$ to 10/mm$^2$ and a contact density of 250 μm$^2$/mm$^2$ to 600 μm$^2$/mm$^2$. It may be seen that the support columns 104 in the present disclosure have high manufacturing accuracy, and are controlled to be micron-sized, such that a thickness of the whole substrate may be ensured to be uniform, inconsistency of color change uniformity may be avoided, the bottleneck problem of mere small-size manufacturing because a volume of the electrolyte solution is difficult to control during manufacturing may be solved, and lightness and thinness of an electrochromic dimming panel may be ensured.

Based on the same inventive concept, an embodiment of the present disclosure further provides architectural dimming glass, which includes the dimming panel described above. Because the architectural dimming glass has a similar principle to solve problems to the dimming panel, reference may be made to implementation of the dimming panel provided in the embodiment of the present disclosure for implementation of the architectural dimming glass provided by an embodiment of the present disclosure, and repetitions will not be repeated herein.

Figure 8:
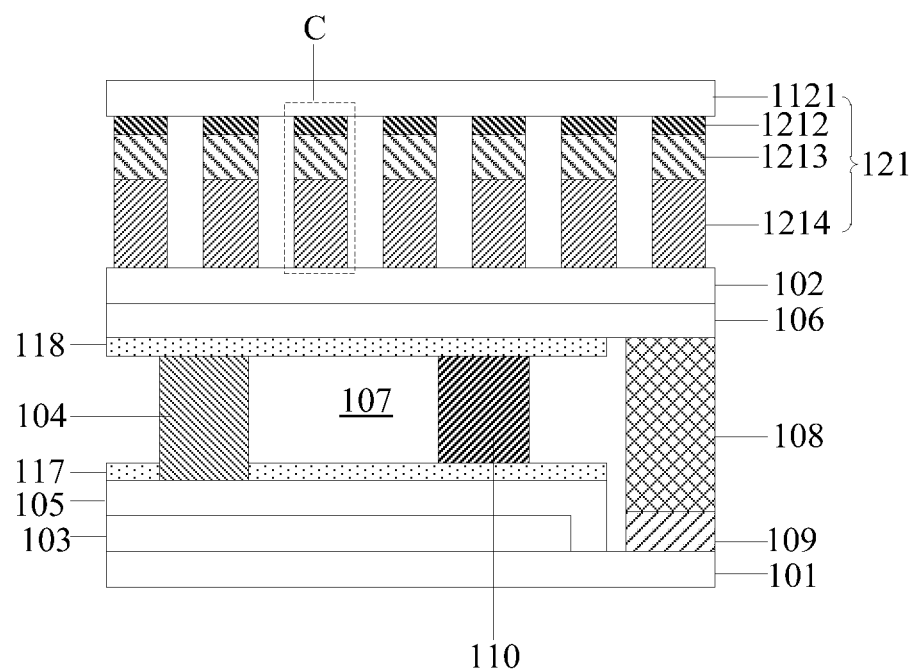
FIG. 8 is another structural schematic diagram of architectural dimming glass provided in an embodiment of the present disclosure.

Optionally, in order to satisfy an industry standard that a reflectivity of a glass curtain wall is less than 30%, as shown in FIG. 8, the architectural dimming glass provided in an embodiment of the present disclosure may further include: an anti-reflection structure 121. The anti-reflection structure 121 may be on one side of a first base substrate 101 away from a second base substrate 102, and/or one side of the second base substrate 102 away from the first base substrate 101.

Optionally, in the architectural dimming glass provided in an embodiment of the present disclosure, as shown in FIG. 8, the anti-reflection structure 121 may include a third base substrate 1211, and a plurality of wire grid structures C that are on one side of the third base substrate 1211 facing the first base substrate 101 and/or the second base substrate 102. Each wire grid structure C includes a first metal wire grid 1212, a second inorganic wire grid 1213 and a third metal wire grid 1214 that are stacked. The first metal wire grid 1212 has a smaller reflectivity than that of the third metal wire grid 1214.

Under long-term irradiation of ultraviolet rays, iodine ions contained in an ordinary polarizer may decompose, and a polyethylene terephthalate (PET) substrate of the ordinary polarizer is easy to break. The wire grid structures C described above may be multiplexed as polarizers, and a plurality of wire grid structures C form one or more hollow cavities. Light waves resonate among the first metal wire grid 1212, the second inorganic wire grid 1213 and the third metal wire grid 1214, in which only a small amount of light is reflected while the remaining light is confined in the hollow cavity. Energy of reflected light may be adjusted by adjusting a thickness of the second inorganic wire grid 1213, thereby achieving a small reflectivity (for example, less than 10%), and satisfying the industry standard of less than 30%. In addition, because an air layer exists in the hollow cavity and a large amount of light is confined in a resonant cavity through resonance, the architectural dimming glass has an energy saving and heat insulation effect.

In some embodiments, the anti-reflection structure 121 is on one side of the architectural dimming glass corresponding to the outdoor, and a conventional polarizer is selected as an analyzer at one side corresponding to the indoor, so as to satisfy requirements of reliability, etc. The anti-reflection structure 121 may also be provided at one side corresponding to the indoor when there is a special or harsh environment indoors. When anti-reflection structures 121 including a plurality of wire grid structures C are on both sides of the architectural dimming glass, extension directions of the wire grid structures C on both sides are orthogonal with each other. During specific implementation, a frame bonding process, a dispensing process or a surface bonding process may be selected to bond a plurality of wire grid structures C to the first base substrate 101 and/or the second base substrate 102. The frame bonding process and the dispensing process are preferable, because the two processes may make the hollow cavity larger. The larger a volume of the hollow cavity, the stronger an air containing effect and the better an energy saving and heat insulation effect.

Optionally, the first metal wire grid 1212, the second inorganic wire grid 1213 and the third metal wire grid 1214 have different thicknesses. During specific implementation, a thickness of the first metal wire grid 1212 may be set to be less than 20 nm, a thickness of the second inorganic wire grid 1213 may be set to range from 50 nm to 100 nm and a thickness of the third metal wire grid 1214 may be set to be more than 100 nm. In addition, the third base substrate 1211 may be made of explosion-proof special engineering glass, such that the architectural dimming glass has more functions.

In some embodiments, the first metal wire grid 1212 may be made of metals such as titanium or alloys, preferably aluminum having an optimal polarizing property. The third metal wire grid 1214 may be made of aluminum, tungsten, silver or other metals or alloys, which is not limited herein. Table 1 shows data of the anti-reflection structure 121 when the first metal wire grid 1212 is titanium (Ti), the second inorganic wire grid 1213 is silicon dioxide (Sift) and the third metal wire grid 1214 is aluminum (Al) compared to an anti-reflection structure when the metal wire grids are aluminum (Al) alone. It may be seen from Table 1 that in the present disclosure, the anti-reflection structure 121 including a plurality of wire grid structures C and the anti-reflection structure with the metal wire grids which are aluminum alone have a high polarization degree; and compared with the anti-reflection structure with the metal wire grids which are aluminum alone, the anti-reflection structure 121 of the present disclosure has lower transmittance and reflectivity, in which a reflectivity is 10% or below. In addition, it may be seen from Table 1 that the anti-reflection structure has a different reflectivity when all wire grid layers have different thicknesses, and the thicker the third metal wire grid 1214 made of aluminum, the higher the reflectivity, while the thinner the first metal wire grid 1212 made of titanium, the lower the reflectivity.

TABLE 1

| Width of wire grid (nm) | Spacing between wire grids (nm) | Thickness of wire grid (nm) | Wire grid structure | Polarization degree | Transmittance | Reflectivity |
|---|---|---|---|---|---|---|
| 50 | 50 | 150 | Al | 99.9660% | 41.7275% | 45.0231% |
|  |  | 8/92/150 | Ti/SiO$_2$/Al | 99.9965% | 26.0035% | 9.1811% |
|  |  | 8/92/185 | Ti/SiO$_2$/Al | 99.9866% | 25.7381% | 9.6112% |
|  |  | 10/85/150 | Ti/SiO$_2$/Al | 99.9972% | 27.3325% | 8.3827% |
|  |  | 15/85/150 | Ti/SiO$_2$/Al | 99.9971% | 27.1053% | 8.5988% |

Optionally, in the architectural dimming glass provided in an embodiment of the present disclosure, in order to ensure a low reflectivity, a period of a wire grid structure C (that is, a sum of the width of wire grid and the spacing between wire grids) is less than 390 nm. For example, the width of wire grid is 50 nm, the spacing between wire grids is 50 nm, and a duty cycle is 1:1. During specific implementation, a wire grid structure C may be manufactured by nano-imprinting, sputtering, deposition, etching or other processes.

Figure 9:
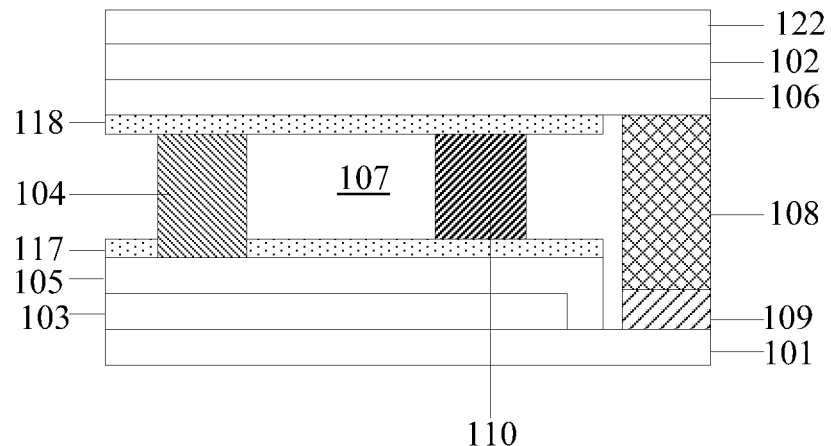
FIG. 9 is another structural schematic diagram of architectural dimming glass provided in an embodiment of the present disclosure.

Optionally, as shown in FIG. 9, the architectural dimming glass provided in an embodiment of the present disclosure may further include: a low-emissivity film 122 on one side of a second base substrate 102 away from a first base substrate 101. The low-emissivity film 122 has a surface emissivity lower than 0.25, a reflectivity greater than 80% to an infrared ray, and a shading coefficient of 0.7, and has desirable heat insulation performance. The first base substrate 101 with the low-emissivity film 122 faces the outdoor, may effectively resist wind and sun, and may further save energy, insulate heat, increase an intensity of architectural dimming glass and prolong the service life.

Figure 10:
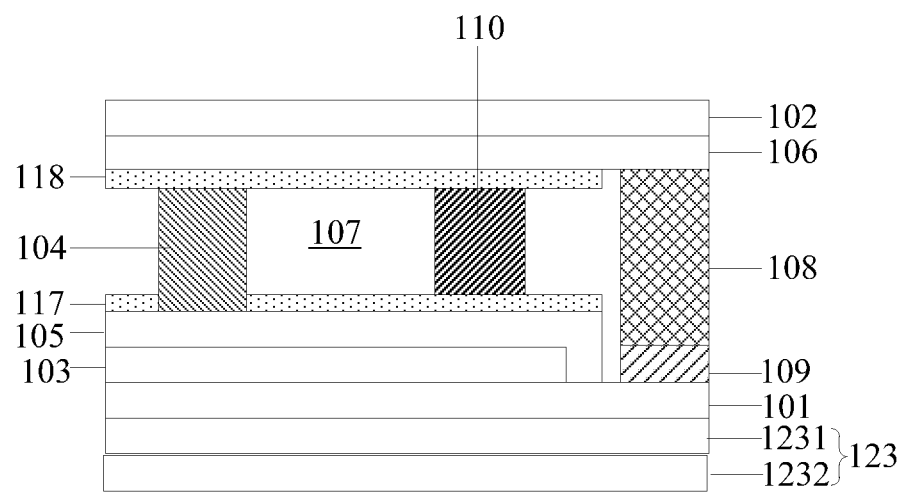
FIG. 10 is another structural schematic diagram of architectural dimming glass provided in an embodiment of the present disclosure.

Optionally, as shown in FIG. 10, the architectural dimming glass provided in an embodiment of the present disclosure may further include: an energy-saving film 123 on one side of a first base substrate 101 away from a second base substrate 102. The energy-saving film 123 includes a metal film 1231 and a polyester base 1232 that are sequentially on one side of the first base substrate 101 away from the second base substrate 102. In the energy-saving film 123, the polyester base 1232 has a thermal conductivity ranging from 0.3 to 0.4, and the metal film 1231 is capable of effectively absorbing and reflecting infrared rays, visible light and ultraviolet rays, thereby greatly improving heat insulation performance of the architectural dimming glass.

Optionally, in the architectural dimming glass provided in an embodiment of the present disclosure, the energy-saving film 123 may be a high-transmittance nano film with a transmittance of visible light greater than or equal to 80% and a rate of blocking solar energy greater than or equal to 55%; or the energy-saving film 123 may also be a high-resistance nano film having a transmittance of visible light greater than or equal to 60% and a rate of blocking solar energy greater than or equal to 72%, thereby achieving heat insulation, energy saving, safety, ultraviolet resistance, glare resistance, building appearance improvement and indoor space aesthetic enhancement. The energy-saving film 123 may be on one side of the architectural dimming glass facing the indoor, such that solar radiation heat may be blocked in summer, and indoor heat energy may be prevented from radiating and flowing out in winter.

In some embodiments, a bonding process of the low-emissivity film 122 and the energy-saving film 123 may be selected according to specific material characteristics and requirements, such as a laminating process, an optical glue full bonding process, a dispensing process or a surface bonding process.

Figure 11:
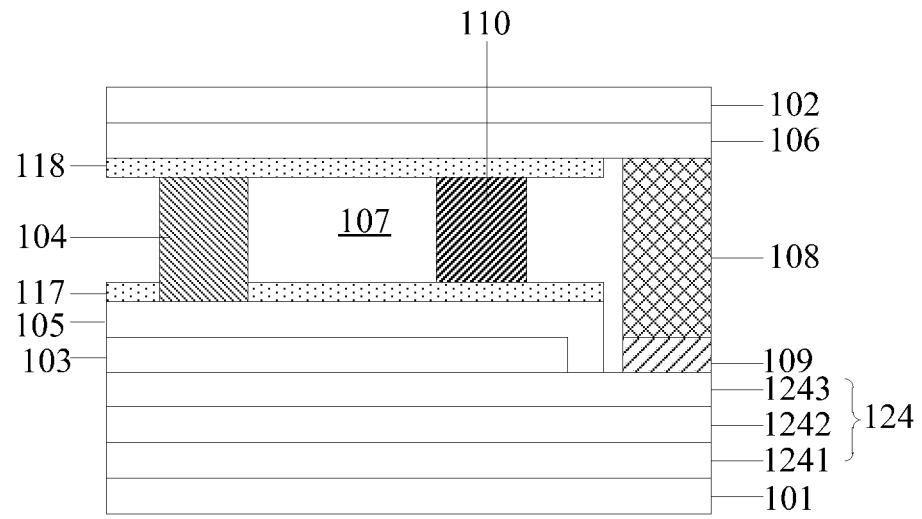
FIG. 11 is another structural schematic diagram of architectural dimming glass provided in an embodiment of the present disclosure.

Optionally, as shown in FIG. 11, the architectural dimming glass provided in an embodiment of the present disclosure may further include: a functional layer 124 between the first base substrate 101 and a first electrode layer 103. The functional layer 124 may include at least one of a black oxide layer 1241, an anti-radiation layer 1242 or an energy-saving layer 1243. In this way, the architectural dimming glass has functions of resisting radiation (reflecting ultraviolet light with a wavelength of 400 nm or below), insulating heat, saving energy (reflecting visible light and far infrared light with a wavelength ranging from 300 nm to 2500 nm), etc.

Figure 12:
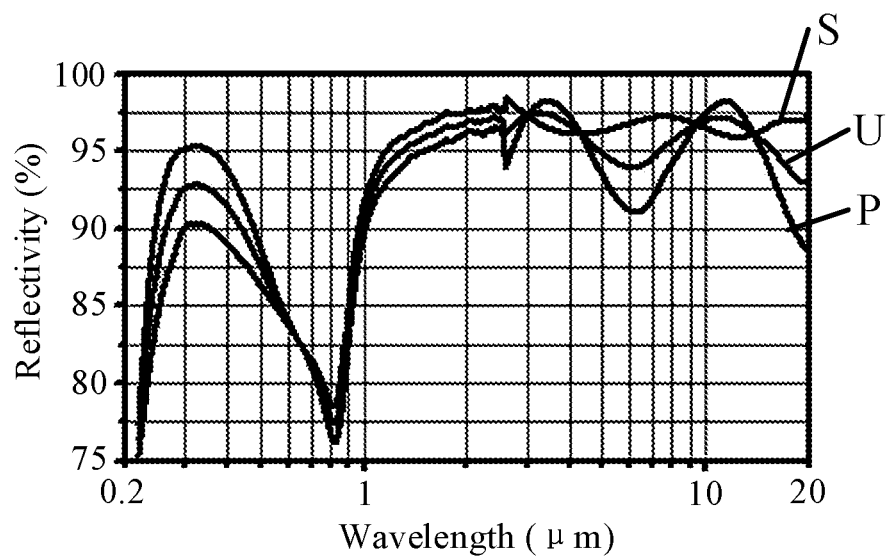
FIG. 12 is a schematic diagram of a reflectivity of an anti-radiation layer in FIG. 11.
Figure 13:
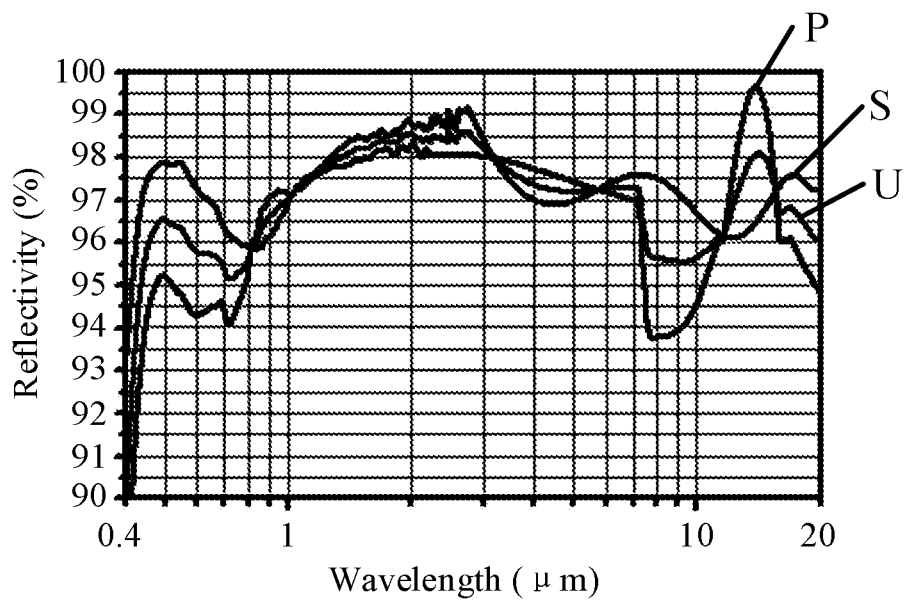
FIG. 13 is a schematic diagram of a reflectivity of an energy-saving layer in FIG. 11.
Figure 14:
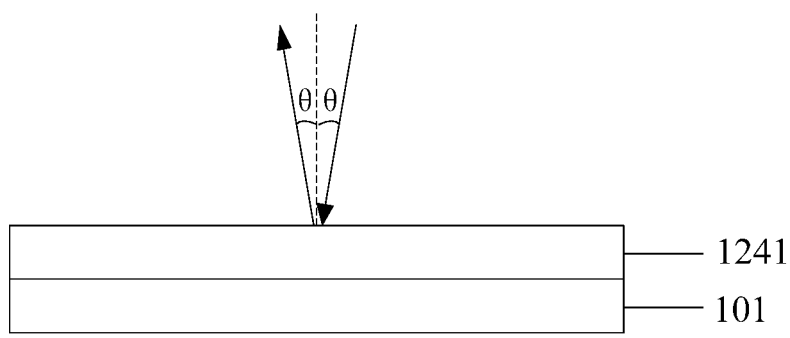
FIG. 14 is a schematic diagram of a path of reflecting light by a black oxide layer in FIG. 11.
Figure 15:
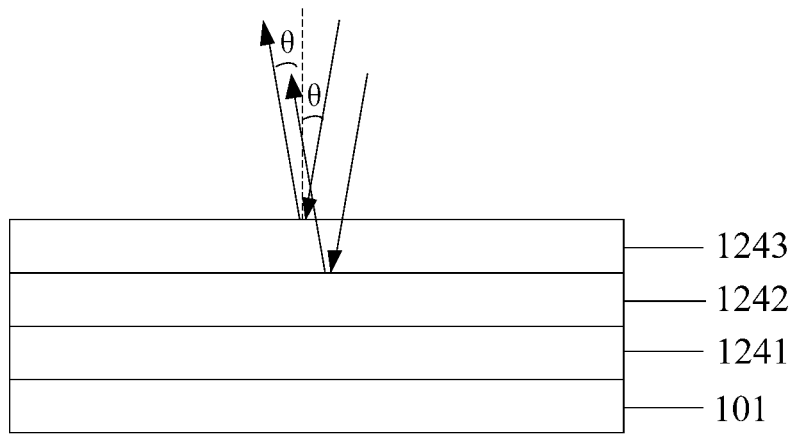
FIG. 15 is a schematic diagram of paths of reflecting light by an anti-radiation layer and an energy-saving layer in FIG. 11.

Optionally, in the architectural dimming glass provided in an embodiment of the present disclosure, as shown in FIG. 11, the functional layer 124 specifically includes the black oxide layer 1241, the anti-radiation layer 1242 and the energy-saving layer 1243 that are sequentially on one side of the first base substrate 101 facing the first electrode layer 103. The black oxide layer 1241 may include: at least one of a molybdenum-niobium alloy film, a molybdenum oxide film or a composite film of silicon nitride and amorphous silicon. The anti-radiation layer 1242 may include at least one of an aluminum metal film, an aluminum alloy film or an aluminum metal compound film. The energy-saving layer 1243 may include at least one of a silver metal film, a silver alloy film or a silver metal compound film. As shown in FIG. 12, aluminum has a strong ultraviolet resistance, and has a reflectivity greater than 75% to light with a wavelength of 400 nm or below, thereby effectively prolonging the service life and enhancing radiation resistance of the architectural dimming glass. Because aluminum has a high reflectivity, and optical pollution may occur when aluminum is used for a curtain wall, an appearance reflectivity of the curtain wall may be reduced by adding the black oxide layer 1241. As a reflectivity of silver to visible light and near infrared light is higher than that of aluminum (as shown in FIG. 13), a better thermal insulation effect may be achieved in winter. In FIGS. 12 and 13, P represents polarized light with a vibration direction parallel to an incident surface, S represents polarized light with a vibration direction perpendicular to the incident surface, and U represents a sum of P polarized light and S polarized light. Specifically, the present disclosure further provides data related to reflectivity of the black oxide layer 1241 (as shown in FIG. 14), the anti-radiation layer 1242 and the energy-saving layer 1243 (as shown in FIG. 15), as shown in Table 2. It may be seen from Table 2 that a reflectivity of the anti-radiation layer 1242 to ultraviolet light is greater than 70%, thereby effectively protecting organic dyes contained in a dimming layer 107 and prolonging the service life of dye liquid crystal architectural dimming glass. A reflectivity of the anti-radiation layer 1242 to visible light is greater than 90%, which may effectively block external heat in summer and reflect internal heat in winter, thereby achieving an energy saving and heat insulation effect. The black oxide layer 1241 ensures that a reflectivity to outdoor visible light is less than 20%, resulting in no optical pollution. An orientation layer, the dimming layer 107, a base substrate, etc., ensure that a reflectivity to indoor visible light is less than 25%, resulting in no optical pollution.

TABLE 2

| Functional layer structure | Reflectivity of functional layer | Reflectivity of architectural dimming glass |
|---|---|---|
| Black oxide layer (MoNb) | 27% | 19.5% (outdoor) |
| Black oxide layer (MoOx) | 17% | 12.3% (outdoor) |
| Black oxide layer (SiNx&a-Si) | 19% | 13.7% (outdoor) |
| Anti-radiation layer (AlNd) | Visible light 90.8% Ultraviolet light 70.2% | 15.8% (indoor) |
| Anti-radiation layer (Al) | Visible light 91.8% Ultraviolet light 74.6% | 15.2% (indoor) |
| Energy-saving layer (Ag) | 94.5% | 24% (indoor) |

Figure 16:
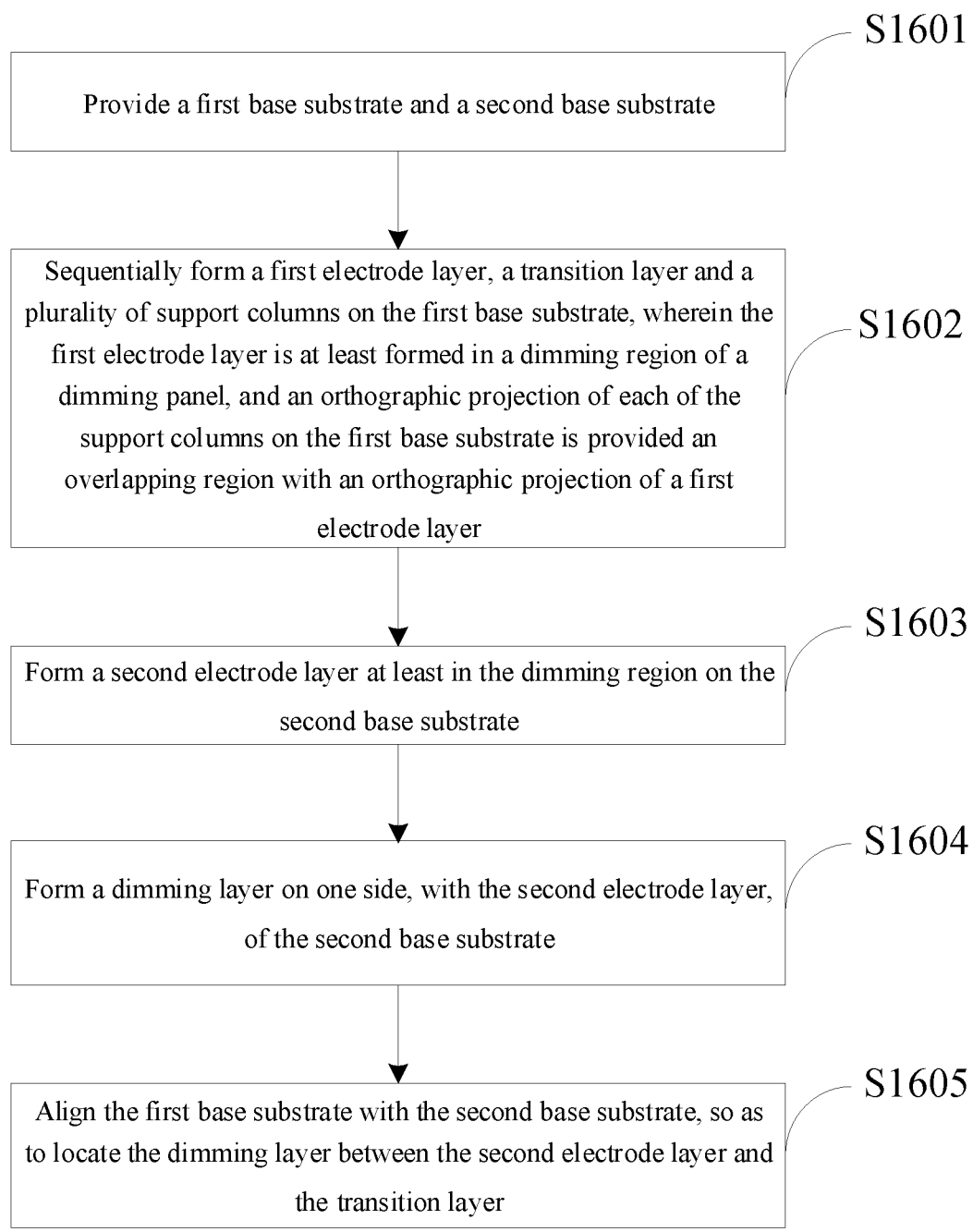
FIG. 16 is a flowchart of a method for manufacturing a dimming panel provided in an embodiment of the present disclosure.

In another aspect, an embodiment of the present disclosure provides a method for manufacturing any one of the dimming panels described above. As shown in FIG. 16, the method includes the following.

S1601, a first base substrate and a second base substrate are provided.

S1602, a first electrode layer, a transition layer and a plurality of support columns are sequentially formed on the first base substrate. The first electrode layer is at least formed in a dimming region of a dimming panel. An orthographic projection of each support column on the first base substrate is provided an overlapping region with an orthographic projection of a first electrode layer.

S1603, a second electrode layer at least in the dimming region is formed on the second base substrate.

S1604, a dimming layer is formed on one side, with the second electrode layer, of the second base substrate.

S1605, the first base substrate and the second base substrate are aligned, so as to locate the dimming layer between the second electrode layer and the transition layer.

For better understanding of the method for manufacturing a dimming panel provided in the present disclosure, processes for manufacturing each dimming panel and architectural dimming glass provided in the present disclosure are described below.

A process for manufacturing a dimming panel shown in FIG. 1 may include the following steps.

Step one: a first electrode layer 103 in a dimming region AA and a third electrode layer 109 in a peripheral region BA are formed on a first base substrate 101 by a one-time patterning process. Certainly, during specific implementation, the first electrode layer 103 and the third electrode layer 109 may also be manufactured separately by a two-time patterning process.

Step two: a transition layer 105 covering the first electrode layer 103 is formed on the first electrode layer 103, and the transition layer 105 fills a gap between the first electrode layer 103 and the third electrode layer 109.

Step three: a plurality of support columns 104 are formed on the transition layer 105.

Step four: polyimide (PI) coating and an orientation process are conducted on the plurality of support columns 104 to form a first orientation layer 117 in the dimming region AA.

Step five: a second electrode layer 106 that is planar is formed on the second base substrate 102.

Step six: PI coating and an orientation process are conducted on the second electrode layer 106, so as to form a second orientation layer 118 in the dimming region AA.

Step seven: liquid crystal drop is conducted on one side, with the second orientation layer 118, of the second base substrate 102.

Step eight: a sealant 110 is formed around the dimming region AA on the first base substrate 101. The sealant 110 may be conductive or not, which is not limited herein.

Step nine: the first base substrate 101 is turned over, and the first base substrate 101 turned over and the second base substrate 102 are aligned.

Step ten: the second base substrate 102 is cut to partially expose the first electrode layer 103 and the third electrode layer 109.

Step eleven: as shown in FIG. 1, a conductive portion 108 is formed on the third electrode layer 109 by a metal paste dispensing process, and the conductive portion 108 electrically connects the second electrode layer 106 and the third electrode layer 109.

Step twelve: the exposed first electrode layer 103 and third electrode layer 109 are subjected to circuit crimping, such that a dimming function may be achieved by adjusting a voltage.

A process for manufacturing a dimming panel shown in FIG. 3 may specifically include the following steps.

Step one: a first electrode layer 103 is formed on a whole surface of a first base substrate 101.

Step two: a transition layer 105 in a dimming region AA and a peripheral region BA is formed on the first electrode layer 103.

Step three: a plurality of support columns 104 in the dimming region AA are formed on the transition layer 105.

Step four: polyimide (PI) coating and an orientation process are conducted on the plurality of support columns 104 to form a first orientation layer 117 in the dimming region AA.

Step five: a third electrode layer 109 an orthographic projection of which on the first base substrate is not overlapped with an orthographic projection of the first orientation layer 117 on the first base substrate is formed on the first orientation layer 117.

Step six: a second electrode layer 106 that is planar is formed on a second base substrate 102.

Step seven: PI coating and an orientation process are conducted on the second electrode layer 106, so as to form a second orientation layer 118 in the dimming region AA.

Step eight: liquid crystal drop is conducted on one side, with the second orientation layer 118, of the second base substrate 102.

Step nine: a sealant 110 is formed around the peripheral region BA on the first base substrate 101. The sealant 110 may be conductive or not, which is not limited herein.

Step ten: the first base substrate 101 is turned over, and the first base substrate 101 turned over and the second base substrate 102 are aligned.

Step eleven: the second base substrate 102 is cut to partially expose the first electrode layer 103 and the third electrode layer 109.

Step twelve: a conductive portion 108 is formed on the third electrode layer 109 by a metal paste dispensing process, and the conductive portion 108 electrically connects the second electrode layer 106 and the third electrode layer 109.

Step thirteen: the exposed first electrode layer 103 and third electrode layer 109 are subjected to circuit crimping, such that a dimming function may be achieved by adjusting a voltage.

A process for manufacturing a dimming panel shown in FIG. 4 is different from the process for manufacturing the dimming panel shown in FIG. 1 in that a conductive portion 108 is multiplexed as a sealant 110, such that a step of manufacturing the conductive portion 108 separately is omitted. In addition, when the conductive portion 108 is multiplexed as the sealant 110, the sealant 110 is seal glue doped with conductive particles such as gold and silver.

A process for manufacturing a dimming panel shown in FIG. 5 is different from a process for manufacturing a dimming panel shown in FIG. 2 in that a conductive portion 108 is multiplexed as a sealant 110, such that a step of manufacturing the conductive portion 108 separately is omitted. In addition, when the conductive portion 108 is multiplexed as the sealant 110, the sealant 110 is seal glue doped with conductive particles such as gold and silver.

Compared with the dimming panel shown in FIG. 1, a process for manufacturing a dimming panel shown in FIG. 6 adds manufacturing of transistors 114, a black matrix 115 and color resists 116. Reference may be made to a process for manufacturing a conventional liquid crystal display panel for a process for manufacturing the transistors 114, the black matrix 115 and the color resists 116, which is not repeated herein.

Compared with the dimming panel shown in FIG. 1, a process for manufacturing a dimming panel shown in FIG. 7 is different in that the step of manufacturing the first orientation layer 117 in FIG. 1 is replaced with the step of manufacturing an electrochromic layer 119, the step of manufacturing the second orientation layer 118 in FIG. 1 is replaced with the step of manufacturing an ion storage layer 120, and the step of liquid crystal drop in FIG. 1 is replaced with the step of electrolyte solution drop or inject. Other steps remain unchanged. Reference may be made to the process for manufacturing the dimming panel shown in FIG. 1 for details, which is not repeated herein.

Compared with the dimming panel shown in FIG. 1, a process for manufacturing architectural dimming glass shown in FIG. 8 adds manufacturing and bonding of an anti-reflection structure. Only related processes of an anti-reflection structure 121 will be described below, and repetitions will not be repeated herein.

Specifically, a first metal wire grid 1212 may be formed on a third base substrate 1211 through nano-imprinting or mask patterning. Then, a second inorganic wire grid 1213 laminated with the first metal wire grid 1212 is formed by a nano-imprinting or mask patterning process. Then, a third metal wire grid 1214 laminated with the second inorganic wire grid 1213 is formed by a nano-imprinting or mask patterning process. In this way, manufacturing of the anti-reflection structure 121 is completed. Then, one side of the anti-reflection structure 121 having the third metal wire grid 1214 is attached to an outer side of a second base substrate 102 by a frame bonding process, a dispensing process, or a surface bonding process, etc.

Compared with the dimming panel shown in FIG. 1, processes for manufacturing architectural dimming glass shown in FIGS. 9 and 10 add a bonding process of a low-emissivity film 122 and an energy-saving film 123 separately, which may be selected according to specific material characteristics and requirements, such as a laminating process, an optical glue full bonding process, a dispensing process or a surface bonding process. Repetitions will not be repeated herein.

Compared with the dimming panel shown in FIG. 1, in a process for manufacturing architectural dimming glass shown in FIG. 11, before a first electrode layer 103 is formed on a first base substrate 101, a black oxide layer 1241, an anti-radiation layer 1242 and an energy-saving layer 1243 are sequentially formed on the first base substrate 101. The black oxide layer 1241, the anti-radiation layer 1242 and the energy-saving layer 1243 constitute an energy-saving layer. Reference may be made to the process for manufacturing the dimming panel shown in FIG. 1 for the remaining steps, which are not repeated herein.

It should be noted that in the method provided in an embodiment of the present disclosure, a patterning process involved in forming each layer structure may not only include some or all processes such as deposition, photoresist coating, masking, exposure, development, etching or photoresist stripping, but include other processes, which specifically depends on a figure required for forming a pattern in an actual manufacturing process and is not limited herein. For example, after development and before etching, a post-baking process may also be included.

A deposition process may be chemical vapor deposition, plasma enhanced chemical vapor deposition or physical vapor deposition, which is not limited herein. A mask used in a masking process may be a half tone mask, a single slit mask or a gray tone mask, which is not limited herein. Etching may be dry etching or wet etching, which is not limited herein.

Figure 17:
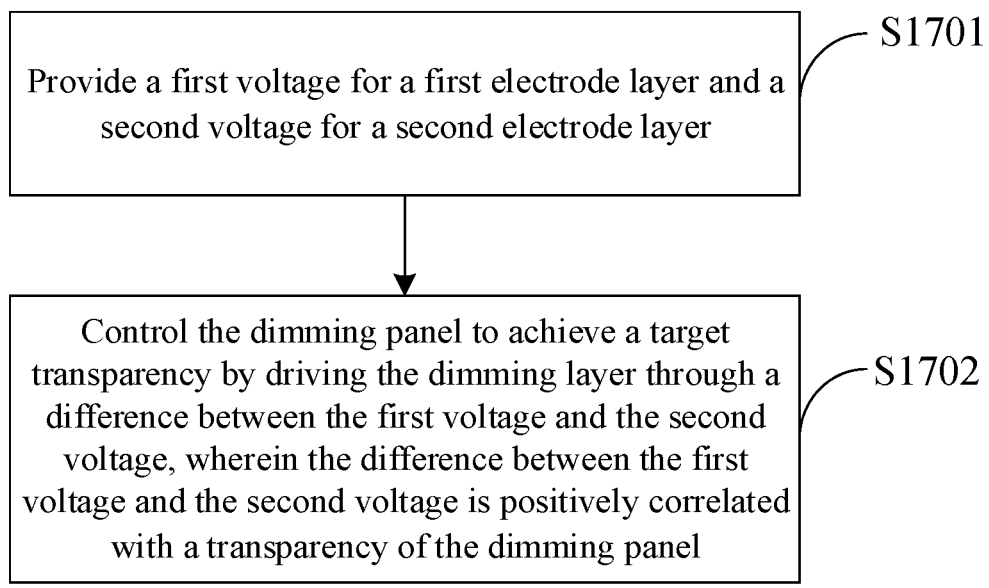
FIG. 17 is a flowchart of a method for driving a dimming panel provided in an embodiment of the present disclosure.

In another aspect, an embodiment of the present disclosure further provides a method for driving any one of the dimming panels described above. as shown in FIG. 17, the method includes the following.

S1701, a first voltage is provided for a first electrode layer and a second voltage is provided for a second electrode layer.

S1702, a dimming layer is driven through a difference between the first voltage and the second voltage to control a dimming panel to achieve a target transparency. The difference between the first voltage and the second voltage is positively correlated with a transparency of the dimming panel. That is, the greater the difference between the first voltage and the second voltage, the greater the transparency of the dimming panel until a bright state having a light transmittance of about 100% is shown; and the smaller the difference between the first voltage and the second voltage, the smaller the transparency of the dimming panel until a dark state having a light transmittance of about 0% is shown.

Optionally, in the method provided in an embodiment of the present disclosure, the transparency of the dimming panel may be specifically controlled manually or automatically. In some embodiments, a digital-controlled direct current power may provide a first voltage for a first electrode layer and a second voltage for a second electrode layer, so as to manually control a dimming panel to achieve a target transparency. In some other embodiments, a photosensitive sensor may be used to convert light transmitting the dimming panel into an electrical signal, and output the electrical signal to the digital-controlled direct current power; and the digital-controlled direct current power provides the first voltage for the first electrode layer and the second voltage for the second electrode layer according to the electrical signal, such that the dimming panel may automatically achieve the target transparency.

The present disclosure provides the dimming panel, the method for manufacturing same, the method for driving same, and the architectural dimming glass. The dimming panel includes: the first base substrate and the second base substrate opposite to each other; the first electrode layer on one side of the first base substrate facing the second base substrate and at least in a dimming region of the dimming panel; the plurality of support columns on one side of the first electrode layer facing the second base substrate, wherein the orthographic projection of each support column on the first base substrate is provided the overlapping region with the orthographic projection of the first electrode layer on the first base substrate; the transition layer between the first electrode layer and the support columns; the second electrode layer on one side of the second base substrate facing the first base substrate, wherein the orthographic projection of the second electrode layer on the first base substrate at least covers the orthographic projection of the first electrode layer on the first base substrate in the dimming region; and the dimming layer between the second electrode layer and the transition layer. The transition layer is between the first electrode layer and the support columns, such that the support columns are attached to the first electrode layer by means of the transition layer, thereby enhancing adhesion between the support columns and the first electrode layer, and reducing risks of fall-off of the support columns.

Apparently, those skilled in the art may make various modifications and variations to the embodiments of the present disclosure without departing from the spirit and scope of the embodiments of the present disclosure. In this way, if these modifications and variations of the embodiments of the present disclosure fall within the scope of the claims of the present disclosure and their equivalent technologies, the present disclosure is also intended to include these modifications and variations.

What is claimed is:

1. A dimming panel, provided with a dimming region and a peripheral region on one side of the dimming region, wherein the dimming panel comprises:
    a first base substrate and a second base substrate opposite to each other;
    a first electrode layer on one side of the first base substrate facing the second base substrate and at least in the dimming region;
    a plurality of support columns on one side of the first electrode layer facing the second base substrate, wherein an orthographic projection of each of the support columns on the first base substrate is provided an overlapping region with an orthographic projection of the first electrode layer on the first base substrate;
    a transition layer between the first electrode layer and the support columns;
    a second electrode layer on one side of the second base substrate facing the first base substrate, wherein an orthographic projection of the second electrode layer on the first base substrate at least covers an orthographic projection of the first electrode layer in the dimming region;
    a dimming layer between the second electrode layer and the transition layer;
    a conductive portion in the peripheral region;
    a third electrode layer on the first base substrate and in the peripheral region; wherein the third electrode layer is insulated from the first electrode layer, and the third electrode layer is electrically connected to the second electrode layer through the conductive portion;
    a sealant in the peripheral region, wherein the conductive portion is multiplexed as the sealant; and
    a first orientation layer on one side of the transition layer facing the dimming layer;
    wherein the transition layer is between the first orientation layer and the first electrode layer, and the transition layer fills a gap between the first electrode layer and the third electrode layer to cause that the third electrode layer is insulated from the first electrode layer.

2. The dimming panel according to claim 1, wherein:
    the third electrode layer and the first electrode layer are in a same layer, the first electrode layer is in the dimming region, and an orthographic projection of the transition layer on the first base substrate completely covers the orthographic projection of the first electrode layer on the first base substrate.

3. The dimming panel according to claim 1, wherein: the first electrode layer is in the dimming region and the peripheral region, the third electrode layer is on one side of the transition layer away from the first electrode layer, and an orthographic projection of the transition layer on the first base substrate is in the orthographic projection of the first electrode layer on the first base substrate.

4. The dimming panel according to claim 1, further comprising:
    a first wire electrically connected to the first electrode layer;
    a second wire electrically connected to the third electrode layer; and
    a digital-controlled direct current power, wherein the digital-controlled direct current power is connected between the first wire and the second wire.

5. The dimming panel according to claim 1, wherein in a direction perpendicular to the first base substrate, the transition layer is provided with a thickness ranging from 2500 Å to 15000 Å.

6. The dimming panel according to claim 1, wherein the first electrode layer is a planar electrode, and the second electrode layer is a planar electrode or comprises a plurality of block sub-electrodes.

7. The dimming panel according to claim 6, wherein in a condition that the second electrode layer comprises the plurality of block sub-electrodes, the dimming panel further comprises:
    a plurality of transistors on the second base substrate;
    a black matrix between the first base substrate and the first electrode layer; and
    a plurality of color resists between the black matrix and the first electrode layer;
    wherein each of the transistors is electrically connected to one corresponding block sub-electrode, the black matrix is provided with a plurality of openings, and each of the openings is internally provided with one corresponding color resist.

8. The dimming panel according to claim 1, wherein the dimming layer is a dye liquid crystal layer, and the dimming panel further comprises: a first orientation layer on one side of the transition layer facing the dimming layer, and a second orientation layer on one side of the second electrode layer facing the dimming layer.

9. The dimming panel according to claim 1, further comprising:
    an electrochromic layer on one side of the transition layer facing the dimming layer and in the dimming region; and an ion storage layer on one side of the second electrode layer facing the dimming layer and in the dimming region;

wherein the dimming layer is an electrolyte solution.

10. Architectural dimming glass, comprising the dimming panel according to claim 1.

11. The architectural dimming glass according to claim 10, further comprising:
an anti-reflection structure; wherein the anti-reflection structure is on one side of a first base substrate away from a second base substrate, and/or on one side of the second base substrate away from the first base substrate.

12. The architectural dimming glass according to claim 11, wherein the anti-reflection structure comprises:
a third base substrate; and
a plurality of wire grid structures that are on one side of the third base substrate facing the first base substrate and/or the second base substrate; wherein each of the wire grid structures comprises a first metal wire grid, a second inorganic wire grid and a third metal wire grid that are stacked, and the first metal wire grid is provided with a smaller reflectivity than that of the third metal wire grid.

13. The architectural dimming glass according to claim 10, further comprising:
a low-emissivity film on one side of a second base substrate away from a first base substrate, wherein the low-emissivity film is provided with a surface emissivity lower than 0.25 and a reflectivity greater than 80% to an infrared ray.

14. The architectural dimming glass according to claim 10, further comprising:
an energy-saving film on one side of a first base substrate away from a second base substrate, wherein the energy-saving film comprises a metal film and a polyester base that are sequentially on one side of the first base substrate away from the second base substrate.

15. The architectural dimming glass according to claim 10, further comprising:
a functional layer between a first base substrate and a first electrode layer, wherein the functional layer comprises at least one of a black oxide layer, an anti-radiation layer or an energy-saving layer; the black oxide layer comprises at least one of a molybdenum-niobium alloy film, a molybdenum oxide film or a composite film of silicon nitride and amorphous silicon; the anti-radiation layer comprises at least one of an aluminum metal film, an aluminum alloy film or an aluminum metal compound film; and the energy-saving layer comprises at least one of a silver metal film, a silver alloy film or a silver metal compound film.

16. A method for manufacturing a dimming panel, wherein the dimming panel is according to claim 1, and the method comprises:
providing a first base substrate and a second base substrate;
sequentially forming a first electrode layer, a transition layer and a plurality of support columns on the first base substrate; wherein the first electrode layer is at least formed in a dimming region of the dimming panel, and an orthographic projection of each of the support columns on the first base substrate is provided an overlapping region with an orthographic projection of the first electrode layer on the first base substrate;
forming a second electrode layer on the second base substrate and at least in the dimming region;
forming a dimming layer on one side, with the second electrode layer, of the second base substrate; and
aligning the first base substrate with the second base substrate to locate the dimming layer between the second electrode layer and the transition layer.

17. A method for driving a dimming panel, wherein the dimming panel is according to claim 1, and the method comprises:
providing a first voltage for a first electrode layer and a second voltage for a second electrode layer; and
controlling, the dimming panel to achieve a target transparency by driving the dimming layer through a difference between the first voltage and the second voltage, wherein the difference between the first voltage and the second voltage is positively correlated with a transparency of the dimming panel.

18. The method according to claim 17, wherein the providing the first voltage for the first electrode layer and the second voltage for the second electrode layer comprises:
converting light passing through the dimming panel into an electrical signal by using a photosensitive sensor, and outputting the electrical signal to a digital-controlled direct current power; and
providing, by the digital-controlled direct current power, the first voltage for the first electrode layer and the second voltage for the second electrode layer according to the electrical signal.

* * * * *